W. E. SYMONS.
AUTOMOBILE FENDER.
APPLICATION FILED MAY 15, 1911.
1,114,412.
Patented Oct. 20, 1914.
4 SHEETS—SHEET 1.
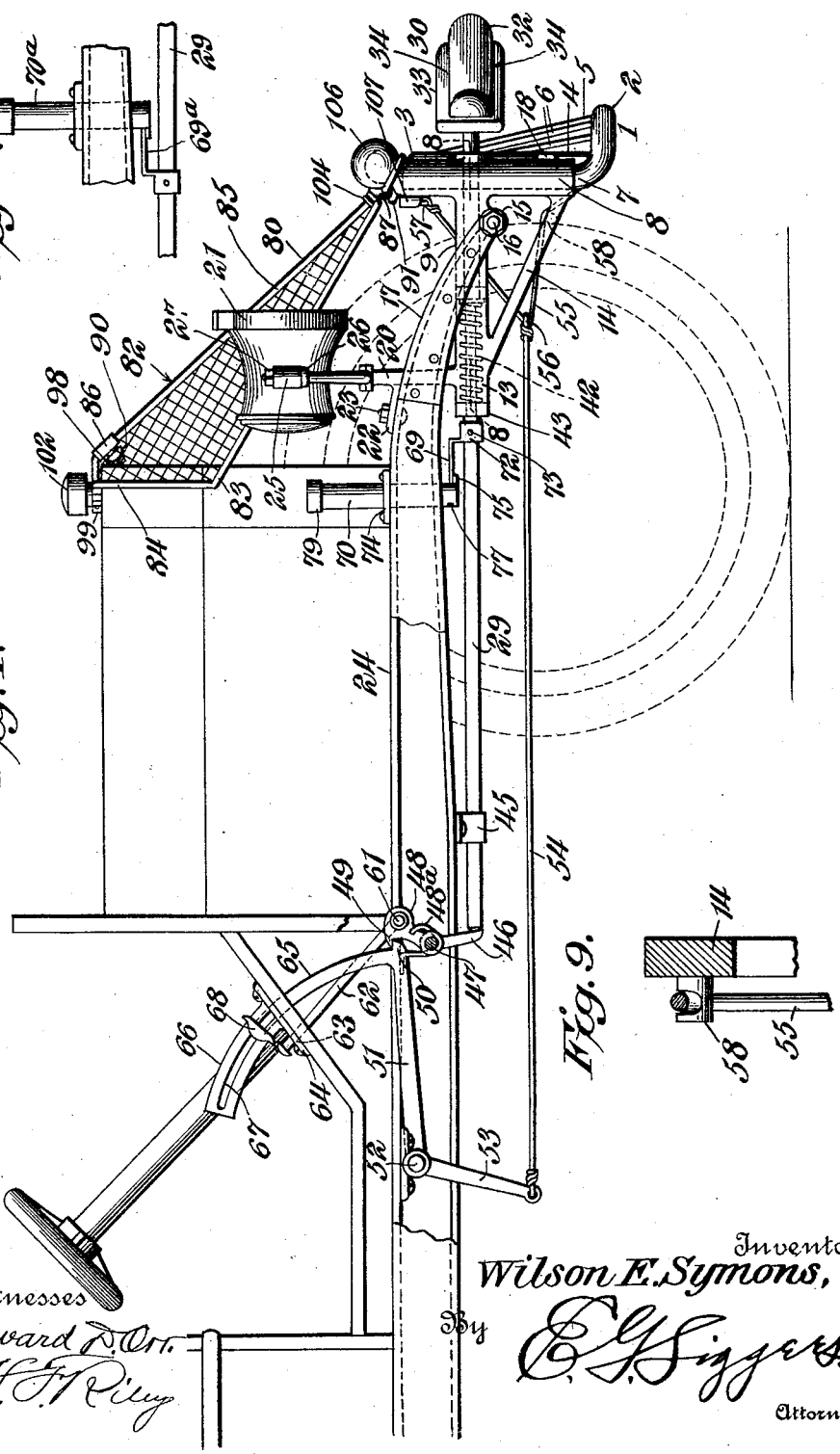
Witnesses
Howard D. Orr.
H. F. Riley
Inventor,
Wilson E. Symons,
By E. G. Siggers.
Attorney W. E. SYMONS.
AUTOMOBILE FENDER.
APPLICATION FILED MAY 15, 1911.
1,114,412.
Patented Oct. 20, 1914.
4 SHEETS—SHEET 2.
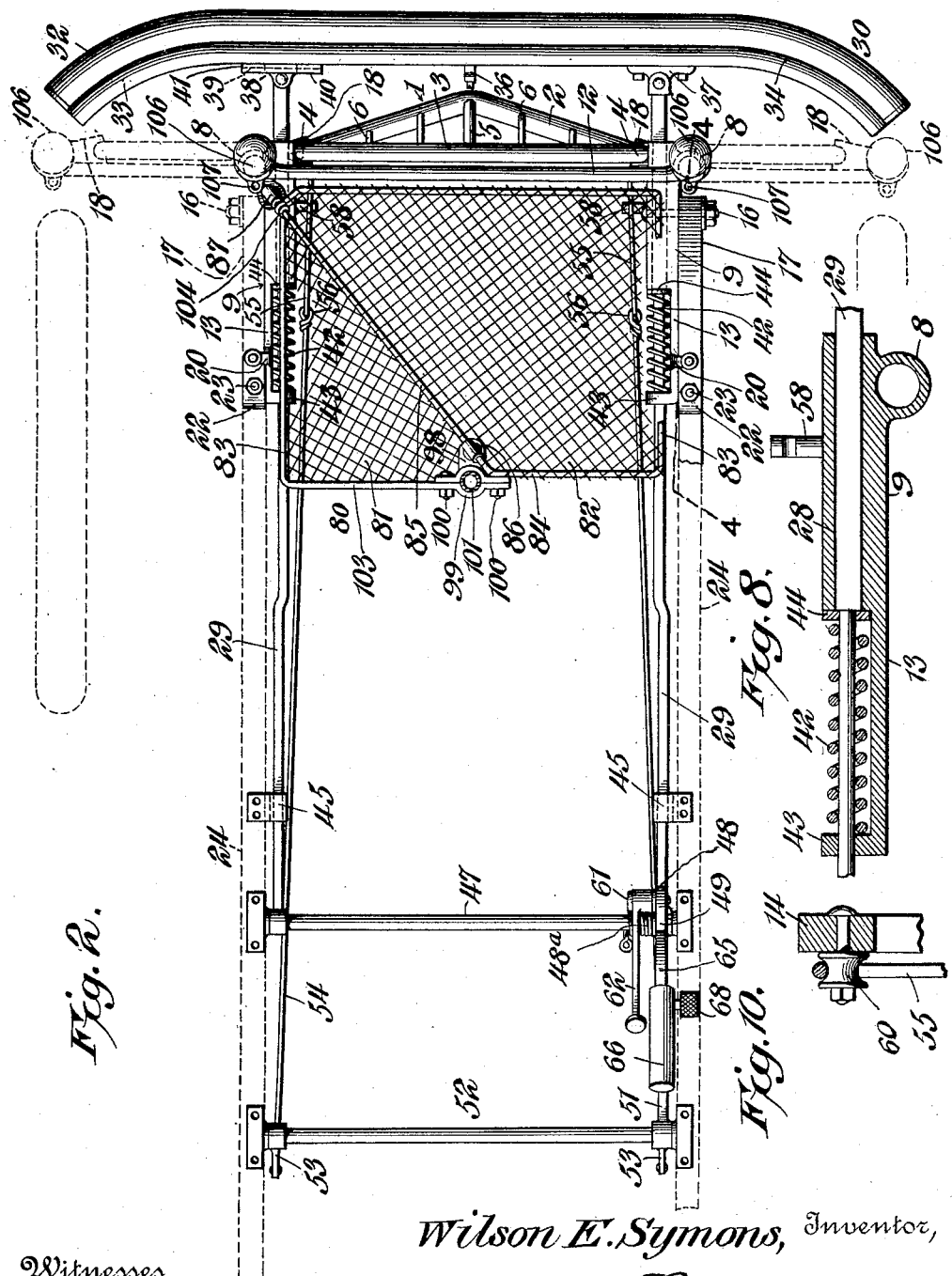
Witnesses
Howard D. Orr
H. T. Riley
Wilson E. Symons, Inventor,
By E. G. Siggers
Attorney W. E. SYMONS.
AUTOMOBILE FENDER.
APPLICATION FILED MAY 15, 1911.
1,114,412.
Patented Oct. 20, 1914.
4 SHEETS—SHEET 3.
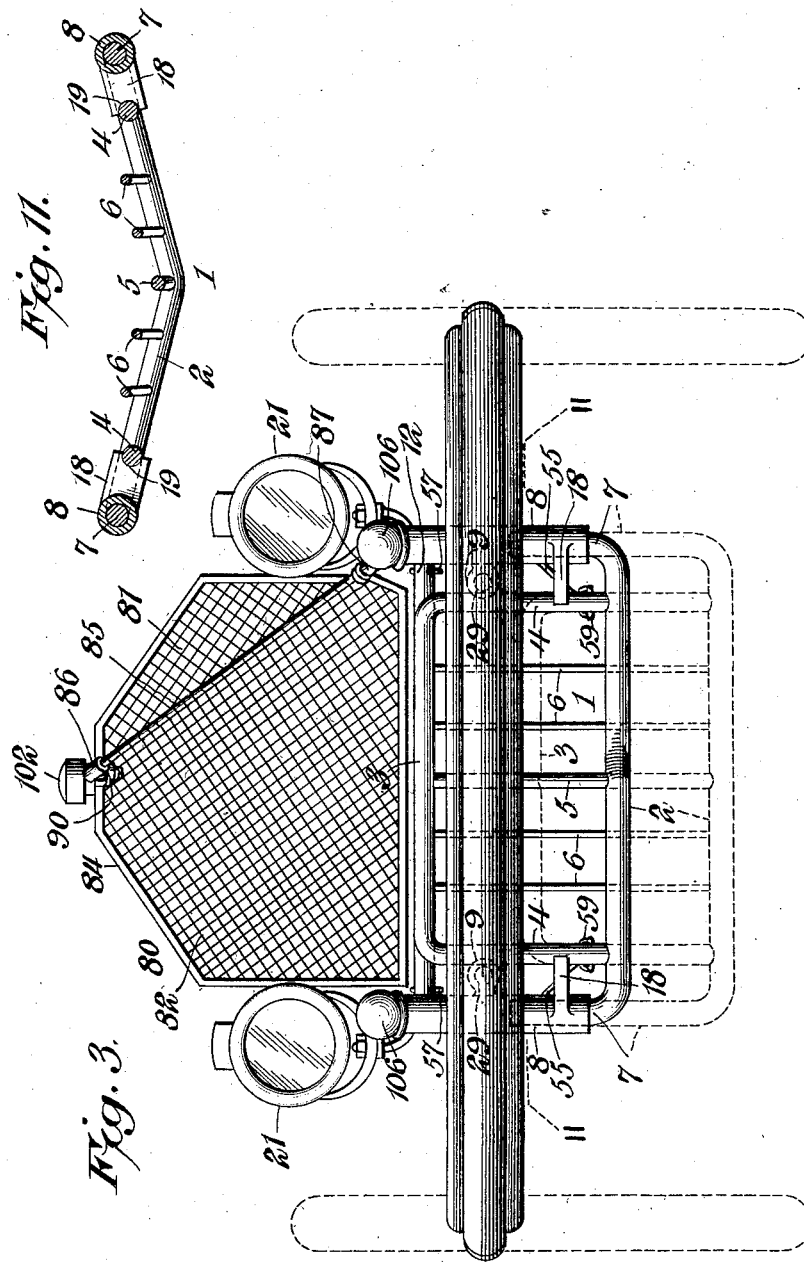
Wilson E. Symons, Inventor,
Witnesses
Howard D. Orr.
H. T. Riley
By E. G. Siggers
Attorney W. E. SYMONS.
AUTOMOBILE FENDER.
APPLICATION FILED MAY 15, 1911.
1,114,412.
Patented Oct. 20, 1914.
4 SHEETS—SHEET 4.
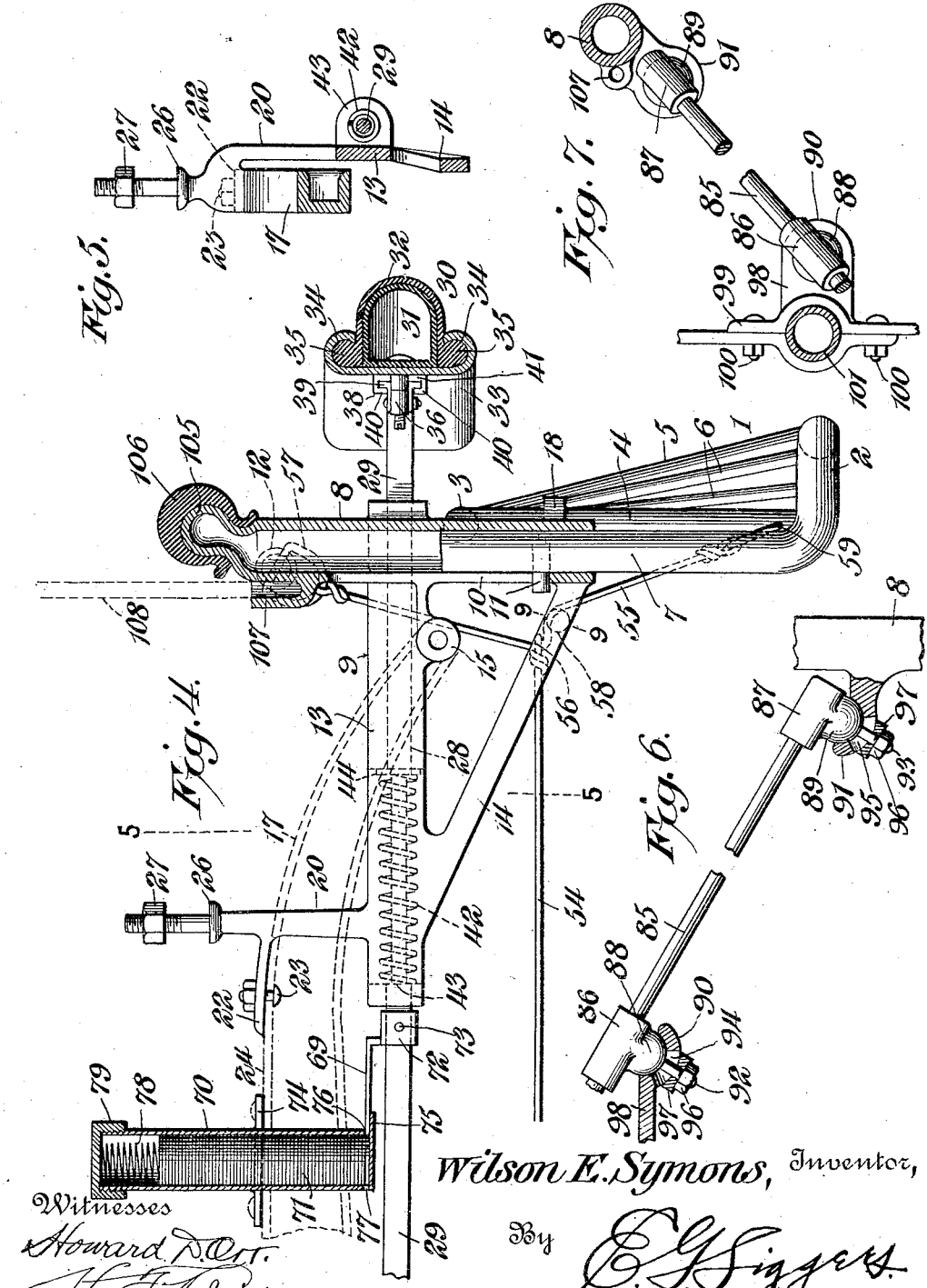
Wilson E. Symons, Inventor,
Witnesses
Howard D. Orr
H. F. Riley
By E. G. Siggers
Attorney

UNITED STATES PATENT OFFICE.

WILSON E. SYMONS, OF CHICAGO, ILLINOIS.

AUTOMOBILE-FENDER.

1,114,412.  Specification of Letters Patent.  Patented Oct. 20, 1914.

Application filed May 15, 1911. Serial No. 627,255.

*To all whom it may concern:*

Be it known that I, WILSON E. SYMONS, a citizen of the United States, residing at Chicago, in the county of Cook and State of Illinois, have invented a new and useful Automobile-Fender, of which the following is a specification.

The invention relates to improvements in automobile fenders.

The object of the present invention is to improve the construction of automobile fenders, and to provide a simple, efficient and comparatively inexpensive automobile fender equipped with a fender proper adapted to be carried normally about the horizontal plane of the axle or the line of axle clearance, and capable, should an automobile come in contact with a person or other object, of dropping automatically and of preventing such person or object from being run over by the automobile.

A further object of the invention is to provide an automobile fender having a buffer adapted to cushion the blow when an automobile strikes a person or is struck, and capable of releasing the fender and automatically dropping the same.

Another object of the invention is to provide operating mechanism for enabling the fender to be dropped instantly by the chauffeur or driver, and for raising and re-setting the fender after operation.

With these and other objects in view, the invention consists in the construction and novel combination of parts hereinafter fully described, illustrated in the accompanying drawings, and pointed out in the claims hereto appended, it being understood that various changes in the form, proportion, size and minor details of construction, within the scope of the claims, may be resorted to without departing from the spirit or sacrificing any of the advantages of the invention.

In the drawings:—Figure 1 is a side elevation of a portion of an automobile equipped with an automobile fender constructed in accordance with this invention. Fig. 2 is a plan view of the same. Fig. 3 is a front elevation. Fig. 4 is an enlarged vertical longitudinal sectional view of the automobile fender, taken substantially on the line 4—4 of Fig. 2. Fig. 5 is a detail sectional view on the line 5—5 of Fig. 4. Figs. 6 and 7 are detail sectional views, illustrating the manner of mounting the hinged section of the screen. Fig. 8 is a detail horizontal sectional view on the line 8—8 of Fig. 1. Fig. 9 is a detail sectional view on the line 9—9 of Fig. 4. Fig. 10 is a similar view, showing another guiding means for the flexible connection for raising the fender proper. Fig. 11 is a horizontal sectional view on the line 11—11 of Fig. 3. Fig. 12 is a detail view of a modification, showing an ejecting slide arranged in rear of a check holding receptacle.

Like numerals of reference designate corresponding parts in all the figures of the drawings.

In the accompanying drawings in which is illustrated the preferred embodiment of the invention, 1 designates the fender proper, constructed of suitable metal and consisting of an approximately V-shaped horizontally disposed bottom bar 2, a straight horizontal top bar 3, and vertical side bars 4, connecting the top and bottom bars. The top and bottom bars are also connected by central and side inclined rods 5 and 6. By this construction, the fender is tapered and inclined similar to an ordinary cow-catcher. The bottom bar 2 is extended laterally beyond the side bars 4, and the fender is provided at opposite sides with vertical arms 7, extending upwardly from the terminal extensions of the bottom bar 2 and slidably arranged in vertical tubular guides 8 of a main supporting bracket 9. The tubular guides 8, which are located at opposite sides of the bracket 9, are provided at their rear sides with vertical slots 10 for the reception of pins or keys 11, carried by the arms 7 and limiting the downward movement of the fender and preventing the arms 7 from dropping out of the tubular guides 8. The slidable mounting of the fender 1 enables the latter to be raised and lowered, and it is normally arranged in an elevated position approximately at the line of axle clearance of the automobile.

The main supporting bracket is composed of the opposite vertical guides 8, a top transverse connecting bar 12, and horizontal longitudinal arms 13, extending rearwardly from the tubular guides 8 at a point intermediate of the ends thereof and supported by inclined braces 14, extending upwardly and rearwardly from the lower ends of the vertical guides 8 and connected with the arms 13 at the rear portions thereof. The arms 13 are provided with eyes 15, located at the lower edges of the arms 13 adjacent to the front ends thereof and secured by bolts 16, or other suitable fastening devices to the front or outer ends of the frame members 17 of the automobile. The guides 8 are provided adjacent to their lower ends with inwardly extending transversely disposed guiding arms 18, arranged horizontally and provided with recesses 19, which receive the vertical side rods 4 of the fender 1. These transverse inwardly projecting arms 18 support the top portion of the fender when the latter is dropped to the dotted position illustrated in Fig. 3 of the drawings, so that there is no liability of the upper portion of the fender yielding, when it is subjected to a jar or strain incident to striking a person or other object.

The rearwardly extending longitudinal arms are provided adjacent to their rear ends with vertical posts or standards 20, forming supports for side or head lights 21 and provided with attaching flanges 22, which are secured by bolts 23, or other suitable fastening devices to the side beams 24 of the frame of the automobile. By this construction, the rearwardly extending arms of the main supporting bracket are connected at their rear portions with the frame of the automobile. The lamp supporting posts or standards 20 are provided with reduced upper portions, adapted to pass through a clamp or eye 25 of the lamp 21, and it has a lower supporting collar or shoulder 26 and is threaded at the end for the reception of a nut 27, but the lamp or head light 21 may be mounted on the post or standard 20 in any other desired manner.

The rearwardly extending side arms of the main supporting bracket are provided at their front portions with longitudinal openings 28 for the reception of reciprocatory side bars 29, projecting outwardly in advance of the main supporting bracket and the fender and supporting a transversely disposed pneumatic buffer 30, extending entirely across the front of the automobile, and having rearwardly curved terminal portions, extending out to the planes of the wheels, as clearly illustrated in Fig. 2 of the drawings. The fender may also be extended entirely across the automobile to the planes of the wheels instead of being of a width corresponding to the width of the body of the automobile, as illustrated in the drawings. The pneumatic buffer is preferably composed of inner and outer tubes 31 and 32 and is of the clencher type, the outer tube being interlocked with a metallic back 33, having its upper and lower edges curved forwardly and inwardly to provide grooves 34 for the reception of ribs 35. The inner tube is equipped with a suitable valve 36, mounted on the metallic back 33 and adapted to be connected with a pump in the usual manner for inflating the pneumatic buffer. The front or outer ends of the side bars 29 are connected by hinges 37 and 38 with the metallic back 33 of the buffer, the hinge connections permitting either side portion of the buffer to be forced rearwardly without straining the connections at the opposite side of the buffer. The hinges 37 and 38 are provided with vertical pivots or pintles, and the leaf or hinge element 39 of the hinge 38 consists of a rectangular plate, slidably mounted in guides or ways 40 of a plate 41. The slidable connection between the buffer and the hinge 38 facilitates the independent operation of the side rods 29 to drop the fender, as hereinafter fully explained. The buffer is also cushioned by coiled springs 42, disposed on the side rods and interposed between fixed eyes 43 and collars 44 of the rods 29. The eyes 43 consist of perforated lugs extending laterally from the inner or rear ends of the arms 13. The rear or inner ends of the coiled springs 42 bear against the lugs 43, and the front end of the springs are engaged by the collars 44, or other suitable means rigidly carried by the reciprocatory side bars. When the side bars are moved inwardly or rearwardly by the buffer, the coiled springs 42 are compressed to cushion the buffer and also to return the parts to their initial position.

The inner or rear portions of the reciprocatory side bars are supported in suitable guides 45, and their inner or rear ends are arranged in advance of the depending arms 46 of a transverse rock shaft 47, mounted in suitable bearings of the frame of the automobile and extending across the same. The rock shaft is also provided with an upwardly extending arm 48, preferably located at the right hand side of the automobile and provided with a projecting shoulder 49 and forming a catch for engaging a projecting terminal 50 of an arm 51 provided on a rock shaft 52. The arm 48, which forms a catch, is maintained in engagement with the arm 51 by means of a suitable spring 48$^a$, which urges the arm 48 upwardly and rearwardly. The spring which may be of any desired construction, preferably consists of a coil secured at one end and having the other end extended around the front edge of the arm 48, and the arm 48 is rounded or beveled above the shoulder and the terminal portion 50 of the arm is also beveled, whereby the arm 51 may be readily engaged with the catch of the arm 48. The arm 51 extends forwardly from the rock shaft 52 and is arranged in an approximately horizontal position when the fender is elevated, as clearly illustrated in Fig. 1 of the drawings.

The rock shaft 52, which extends across the frame of the automobile, as clearly illustrated in Fig. 2 of the drawings, is provided at its opposite ends with depending arms 53, which are connected by wire cords or cables 54, or other suitable flexible connections with wire cords or cables 55. The wire cords or cables 55, which are passed through eyes 56 of the front ends of the wire cords or cables 54, are composed of upper and lower branches; the upper branches are secured to the top transverse connecting bar 12 by links 57, and the lower branches pass over guides 58, and are secured to the fender by links 59, which pierce the lower portions of the side rods 4. The wire rods or cables 54 may extend directly to the lower portion of the fender instead of employing separate front flexible connections and any suitable guiding means may be provided. When the depending arms 53 of the transverse rock shaft 52 are swung rearwardly, the flexible connections 54 will pull rearwardly on the flexible connections 55 and the fender will be elevated. The locking of the arm 51 will maintain the fender in an elevated position, and when the buffer comes in contact with a person or other object, the longitudinal side rods 29 will be forced inwardly or rearwardly, thereby partially rotating the rock shaft 47 and swinging the arm 48 thereof forwardly out of engagement with the terminal 50 of the arm 51. This will release the fender, which will drop by gravity. The fender may also be dropped by the chauffeur or driver, and for this purpose the arm 48 is connected by a pivot 61 with the lower end of an inclined operating rod 62, guided in a suitable opening 63 of a plate 64, and provided at its upper end with a head, adapted to be engaged by the foot. When the operating rod 62 is depressed, the arm 48 is swung forwardly out of engagement with the arm 51 and the fender is permitted to drop. The rock shaft 52 is rotated to elevate the fender by means of a curved bar 65, extending upwardly and rearwardly from the outer end of the arm 51 into an arcuate tubular guide 66, projecting upwardly and rearwardly from the plate 64 and preferably formed integral with the same and provided at one side with a longitudinal slot 67, in which operates the shank of a foot plate 68. The foot plate extends on the bar 65 laterally from the tubular guide and is adapted to be depressed by the foot of the chauffeur or driver of an automobile or car.

One of the reciprocatory side rods 29 carries an ejecting slide 69, operating within the lower end of a vertical receptacle 70, and adapted to eject one or more identification checks 71 from the receptacle. The slide is provided at its front end with a sleeve 72, which is secured by a set screw 73, or other suitable means to the adjacent side bar 29. The receptacle 70, which preferably consists of a cylinder, is arranged in a vertical position and is provided at an intermediate point with an attaching flange 74, which is secured to the frame of the automobile. The lower end of the receptacle 70 is provided with a forwardly projecting flange 75, and it has opposite front and rear slots 76 and 77. The slide 69 is normally arranged at the front slot 76 and is supported in position by the projecting flange 75. When the side bar 29 is moved rearwardly, it carries with it the slide 69, which is forced through the bottom portion of the receptacle 70, thereby ejecting a predetermined number of checks 71 through the rear openings 77. When the ejecting slide is moved forwardly, the checks within the receptacle 70 drop in order that the bottom ones may be in position to be engaged by the slide, and a coiled spring 78 is interposed between the top check and a removable cap 79, in order to positively force the checks to the bottom of the receptacle. The checks are designed to bear the number of the automobile or other identification matter, so that in event of an accident positive and unmistakable evidence of the automobile will be left on the ground. The cap 79 is interiorly threaded to engage corresponding threads of the upper end of the receptacle, but it may be secured to the same in any other desired manner. Also an ejecting slide 69ª may be mounted in rear of a receptacle 70ª so as to be actuated by the forward movement of the side bars 29. The check holding receptacle 70ª is mounted on the frame of the automobile in the same manner as the receptacle 70 heretofore described. It is preferable to arrange the check ejecting slide in advance of the receptacle as shown in Fig. 1, as the identification checks will be immediately ejected and the slide will exclude dust, rain, snow and the like from the front opening 76, which would be exposed were the slide mounted at the back of the receptacle. No claim is made in the present application to the means for ejecting the identification checks.

In order to prevent a person when struck by the buffer from falling over the same into the space between the fender and the radiator, a screen 80 is employed. The screen 80 consists of a fixed section 81 and a hinged section 82, adapted to be raised to afford access to the front of the automobile for cranking the engine. The sections 81 and 82 of the screen are constructed of wire gauze or other suitable material, and the screen, which is inclined downwardly and forwardly from the top of the radiator, as clearly illustrated in Fig. 1 of the drawings, has its side portions 83 laterally inclined to fit the inclined portions at the top of the radiator. The hinged section 82 is preferably provided with a marginal metallic frame 84, having an inclined inner portion 85, extending from the center of the top of the radiator to one of the vertical tubular guides 8, and rounded to form a pintle rod on which the hinged section 82 swings in the opening and closing of the same. The pintle rod 85 is mounted in upper and lower eyes or sleeves 86 and 87, provided at their lower sides with rounded bearing heads 88 and 89, which are recessed in upper and lower bearings 90 and 91. The bearings 90 and 91 are approximately cup-shaped to receive the rounded bearing heads 88 and 89 for forming partial ball and socket connections, and the bearing heads 88 and 89 are secured in the bearings 90 and 91 by bolts 92 and 93, extending through slots 94 and 95 of the bearings 90 and 91 and provided with nuts 96, which secure the bearing heads in their respective bearings. Plates or washers 97 are interposed between the nuts and the lower faces of the bearings and are provided with concave faces to fit the same. The upper bearing 90 is located at the front or outer portion of the plate or arm 98, which is formed integral with one member of a clamp 99. The clamp 99 is composed of two sections or members connected by bolts 100, and adapted to embrace the tubular extension 101 upon which the radiator cap 102 is mounted. The lower bearing 91 is formed integral with and projects rearwardly from the adjacent tubular guide 8 of the main bracket. The relatively fixed section 81 is provided at the top and outer side with a marginal frame 103, preferably formed integral with one section of the clamp, whereby the marginal frame is secured at the top. The marginal frame 103 may be provided at the bottom with an eye 104, and arranged on the pintle rod 85, but the marginal frame 103 may be secured at the bottom in any other desired manner. The buffer is arranged to strike a person near the center of the body, and it has a tendency to trip the person struck and there is liability of such person falling inwardly over the buffer onto the screen, which will prevent him from falling through the space between the front of the fender and the front of the automobile.

The vertical tubular guides 8 are provided at their upper ends with knobs or heads 105, which are covered by caps 106 of rubber, or other suitable material, forming cushions, and adapted to prevent a person from being injured through contact with the upper ends of the vertical guides 8. The vertical guides 8 are also provided at the back with integral vertical sockets 107, adapted to receive the staff 108 of a flag, as illustrated in dotted lines in Fig. 4 of the drawings.

It will be seen that while the fender is under the control of the chauffeur or driver, who may instantly drop the fender and also re-set the same after an operation thereof, the automobile fender is also automatic in its operation, and in this respect is independent of the control of the driver or chauffeur and will positively operate should the chauffeur be asleep, drunk, careless or reckless.

Having thus fully described my invention, what I claim as new and desire to secure by Letters Patent, is:—

1. A device of the class described including a fender slidable upwardly and downwardly, means for guiding the fender in its sliding movement, means for normally maintaining the fender in an elevated position, a buffer arranged in advance of the fender and slidable backwardly and forwardly and connected with and adapted to operate the said holding means for automatically tripping or releasing the fender, and operating mechanism connected with the said holding means to enable the fender to be lowered by an operator.

2. A device of the class described including a fender movable upwardly and downwardly, means for guiding the fender, holding means for normally maintaining the fender in an elevated position, a buffer arranged in advance of the fender and movable backwardly and forwardly and connected with and adapted to operate the said holding means for automatically tripping or releasing the fender, and mechanism connected with the fender for raising the same to reëngage the fender with the holding means.

3. A device of the class described including a fender movable upwardly and downwardly, means for guiding the fender, holding means for normally maintaining the fender in an elevated position, a buffer arranged in advance of the fender and movable backwardly and forwardly and connected with and adapted to operate the said holding means for automatically tripping or releasing the fender, operating mechanism connected with the said holding means to enable the fender to be lowered by an operator, and mechanism connected with the fender for raising the same to reëngage the fender with the holding means.

4. A device of the class described including a main supporting bracket provided at opposite sides with upright guides and having rearwardly extending arms located at opposite sides of the bracket and provided with means for securing them to the front portions of the sides of the frame of an automobile, an upright fender located in advance of the automobile and slidable upwardly and downwardly in the guides of said bracket, and means for supporting and tripping the fender including a transversely disposed buffer located in advance of the fender and slidably supported by the main bracket.

5. A fender attachment comprising a supporting bracket, a fender attached to said bracket and vertically movable as an entirety in respect thereto, means for holding the fender in its raised position, and an automatic tripping device for releasing said fender including a buffer arranged in advance of and above the fender and slidably mounted on the said bracket.

6. A fender attachment comprising a supporting bracket, a fender attached to said bracket and vertically movable as an entirety in respect thereto, means for holding the fender in its raised position, and an automatic tripping device for releasing said fender including a buffer arranged in advance of and above the fender, and longitudinal reciprocatory side bars slidably mounted on the bracket and connected with and supporting the buffer.

7. A device of the class described including a main supporting bracket having means for mounting it on an automobile at the front thereof and provided at opposite sides with upright guides, a fender movable upwardly and downwardly in the guides, a catch for holding the fender in an elevated position, and a buffer located in front of the fender in advance of the automobile and slidable backwardly and forwardly and connected with the catch and adapted when moved rearwardly to operate the catch for releasing the fender.

8. A device of the class described comprising a main supporting bracket provided with opposite upright guides and having means for mounting it on an automobile at the front thereof, and an upright fender located between the upright guides and provided at opposite sides with upwardly extending arms slidable in the guides, and means for operating the fender including a slidably mounted buffer located in advance of the fender and arranged to extend across the front of an automobile.

9. A device of the class described including a main supporting bracket provided at opposite sides with vertical tubular guides and having means for mounting it on an automobile at the front thereof, an upright fender located between the upright guides and provided at opposite sides with arms connected at their lower ends with the bottom portion of the fender and extending into the tubular guides through the lower ends thereof, means for limiting the downward movement of the fender, and operating mechanism for raising and lowering the fender.

10. A device of the class described including a main supporting bracket provided at opposite sides with upright tubular guides and having means for mounting it on an automobile at the front thereof, said guides being also provided at the bottom with inwardly extending guiding arms, and an upright fender having its body portion guided between the said arms and provided at opposite sides with upright arms extending into the tubular guides and slidable therein, and operating mechanism for raising and lowering the fender.

11. A device of the class described including opposite upright tubular guides, and an upright fender composed of spaced bars, top and bottom bars connecting the spaced bars, the bottom bar being provided at opposite sides of the fender with lateral extensions having upright arms spaced from the sides of the fender and extending into the tubular guides, said fender being slidable upwardly and downwardly.

12. A device of the class described including opposite upright tubular guides, and an upright fender comprising an approximately V-shaped bottom bar having terminal extensions provided with upright arms slidable in the tubular guides, a straight transverse top bar, vertical side bars connecting the top and bottom bars, and spaced rods also connecting the top and bottom bars.

13. A device of the class described including opposite upright tubular guides provided with inwardly extending guiding arms, and an upright fender comprising an approximately V-shaped bottom bar having terminal extensions provided with an upright arm slidable in the tubular guides, a straight transverse top bar, vertical side bars connecting the top and bottom bars and slidable between the said arms, and spaced rods connecting the top and bottom bars of the fender.

14. A device of the class described including a main supporting bracket provided at opposite sides with upright fender guides and having opposite longitudinal arms provided with means for securing them to the frame of an automobile, said arms being also provided with integral upright standards having means for connecting them with the automobile frame.

15. A device of the class described including a main supporting bracket provided at opposite sides with upright guides and having opposite longitudinal arms provided with means for securing them to the frame of an automobile, said arms being also provided with posts or brackets having attaching flanges located at a point between the upper and lower ends of the posts or standards and adapted to be secured to the frame of an automobile, the upper portions of the posts or standards having supporting shoulders and provided with threads to receive nuts.

16. A device of the class described including a main supporting bracket having upright guides, a fender movable upwardly and downwardly in the guides, a buffer located in advance of the fender, bars slidably mounted on the supporting bracket and supporting the buffer, and springs mounted on the bars and cushioning the buffer.

17. A device of the class described including a main supporting bracket having upright guides, a fender movable upwardly and downwardly in the guides, a buffer located in advance of the fender, bars slidably mounted on the supporting bracket and supporting the buffer, springs mounted on the bars and cushioning the buffer, means for normally supporting the fender in an elevated position, and means operated by the inward movement of the said bars for automatically dropping the fender.

18. A device of the class described including a main supporting bracket comprising vertical guides located at opposite sides of the supporting bracket, a transverse rod connecting the guides and arms extending rearwardly from the guides and having means for securing them to an automobile, said arms being provided with longitudinal openings, side bars slidable in the openings, springs for cushioning the side bars, and a buffer provided with hinges connecting the buffer with the outer ends of the side bars.

19. A device of the class described including a main supporting bracket comprising vertical guides located at opposite sides of the supporting bracket, a transverse rod connecting the guides and arms extending rearwardly from the guides and having means for securing them to an automobile, said arms being provided with longitudinal openings, side bars slidable in the openings, springs for cushioning the side bars, and a buffer provided with hinges connecting the buffer with the outer ends of the side bars, one of the hinges being slidably mounted on the buffer.

20. A device of the class described comprising a main supporting bracket provided with means for securing it to the front of an automobile, a fender slidable upwardly and downwardly on the bracket, means for raising the fender, said means including an oscillatory arm, a rock shaft provided with opposite arms and having a catch arranged to engage the first-mentioned arm for locking the fender in an elevated position, a buffer, and side bars slidably mounted on the bracket and supporting the buffer and arranged to engage the arms of the said rock shaft, whereby when the buffer is moved inwardly the catch will be swung out of engagement with the co-acting arm to release the fender.

21. A device of the class described comprising a bracket provided with means for mounting it on an automobile, an upright fender movable upwardly and downwardly on the bracket, means for raising the fender including a rock shaft provided with arms, flexible connections extending from the arms to the fender, and means for guiding the flexible connections, a catch for holding the rock shaft against movement to support the fender in an elevated position, a buffer, and a bar slidably mounted on the bracket and connected with the buffer and arranged to operate the catch for releasing the rock shaft when the buffer is moved inwardly.

22. A device of the class described comprising a main supporting bracket provided with means for mounting it on an automobile and having opposite upright guides, a fender movable upwardly and downwardly in the said guides, means for raising the fender including a depending oscillatory arm, connections between the arm and the fender, a forwardly extending arm connected with the said arm and provided with a curved upwardly extending bar, a curved guide receiving the curved bar, and operating means arranged exteriorly of the guide for actuating the curved bar.

23. A device of the class described comprising a main supporting bracket provided with means for mounting it on an automobile and having opposite upright guides, a fender movable upwardly and downwardly in the said guides, means for raising the fender including a depending oscillatory arm, connections between the arm and the fender, a forwardly extending arm connected with the said arm and provided with a curved upwardly extending bar, a curved guide receiving the curved bar, said curved guide being provided with a longitudinal slot, and a foot plate having a connecting portion secured to the curved bar and operating in the slot of the curved guide.

24. A device of the class described comprising a main supporting bracket provided with means for mounting it on an automobile at the front thereof, a fender movable upwardly and downwardly in the guides, a buffer, side bars supporting the buffer and slidably mounted on the said bracket, means for raising the fender including a rock shaft having a forwardly extending arm, and connections between the rock shaft and the fender, and a second rock shaft having arms arranged to be engaged by the said side bars, the last-mentioned rock shaft being also provided with a catch arranged to engage the forwardly projecting arm of the first-mentioned rock shaft for holding the fender in an elevated position.

25. A device of the class described comprising a main bracket provided at opposite sides at the back with means for mounting it on an automobile at the front thereof and having upright guides, a fender movable upwardly, and downwardly in the said guides, mechanism for raising the fender, a catch connected with the said mechanism for holding the fender in an elevated position, and operating mechanism connected with the catch for operating the same to release the fender, said operating mechanism including a transverse buffer located in advance of the fender and slidably supported by the main bracket.

26. A device of the class described comprising a main bracket provided at opposite sides at the back with means for mounting it on an automobile at the front thereof and having upright guides, a fender movable upwardly and downwardly in the said guides, mechanism for raising the fender, a catch connected with the said mechanism for holding the fender in an elevated position, and an operating rod pivotally connected at one end with the catch and having its other end arranged to be depressed by the foot.

27. A device of the class described including a main bracket provided with means for securing it to an automobile at the front thereof and having upright guides, a fender movable upwardly and downwardly in the said guides, mechanism connected with the fender for raising the same, a catch engaging the said mechanism for holding the fender in an elevated position, and means for operating the catch to release the fender.

28. A device of the class described including a main bracket provided with means for securing it to an automobile at the front thereof and having upright guides, a fender movable upwardly and downwardly in the said guides, mechanism connected with the fender for raising the same, a catch engaging the said mechanism for holding the fender in an elevated position, a buffer movable inwardly and outwardly, and means actuated by the buffer for operating the catch to release the fender automatically when the buffer is moved inwardly or rearwardly.

29. A device of the class described including a bracket provided with means for securing it to an automobile at the front thereof and having upright guides, a fender movable upwardly and downwardly in the guides, a buffer, side bars supporting the buffer and slidably mounted on the bracket and movable inwardly and outwardly, mechanism for raising the fender, a catch engaging the said mechanism for holding the fender in an elevated position, and means actuated by the inward movement of the side bars for operating the catch to release the fender.

30. A device of the class described including a bracket having upright guides, a fender slidable upwardly and downwardly in the guides, a front flexible connection secured at its terminals to the bracket and to the fender, a rearwardly extending flexible connection connected with the front flexible connection at a point intermediate of the ends thereof, an operating device connected with the rearwardly extending flexible connection, and means for locking the fender in an elevated position.

31. A device of the class described including a bracket having upright guides, a fender slidable upwardly and downwardly in the guides, a front flexible connection secured at its terminals to the bracket and to the fender, a rearwardly extending flexible connection slidably connected at its front end with the front flexible connection at a point intermediate of the ends thereof and forming upper and lower branches of the front flexible connection, guiding means receiving the lower branch of the front flexible connection, an operating device connected with the rearwardly extending flexible connection, and means for locking the fender in an elevated position.

32. A device of the class described including a fender, means for mounting the same at the front of an automobile in advance of the engine in spaced relation with the latter, and an inclined screen extending upwardly and rearwardly at the space between the fender and the engine and having a hinged section located above the fender and adapted to be raised to afford access to the said space for cranking the engine.

33. A device of the class described including a main bracket provided with means for mounting it on an automobile at the front thereof, a fender carried by the bracket and arranged in advance of the engine, and an inclined screen extending upwardly and rearwardly at the space between the fender and engine and provided with a hinged section having an inclined pintle rod supported at its lower end upon the said bracket, and means arranged at the top of the radiator of the automobile for supporting the upper end of the bracket.

34. A device of the class described including a supporting bracket provided with means for mounting it on an automobile at the front thereof and having a bearing socket, a fender supported by the bracket, a clamp adapted to engage the automobile at the radiator cap and provided with a bearing socket, an inclined screen composed of fixed and movable sections, the movable section having a pintle rod, and sleeves receiving the pintle rod and having bearing heads secured in the said bracket.

35. A device of the class described including a supporting bracket provided with means for mounting it on an automobile at the front thereof and having a bearing bracket provided with a slot, a clamp adapted to engage an automobile at the radiator cap and provided with a socket having a slot, an inclined screen composed of fixed and movable sections, the movable section being provided with an inclined pintle rod, sleeves receiving the pintle rod and provided with bearing heads fitting in the said sockets and having bolts operating in the slots of the sockets, and nuts mounted on the bolts and securing the bearing heads in the sockets.

In testimony that I claim the foregoing as my own, I have hereto affixed my signature in the presence of two witnesses.

WILSON E. SYMONS.

Witnesses:
ALFRED COWLES,
G. E. TEUTON.

Copies of this patent may be obtained for five cents each, by addressing the "Commissioner of Patents, Washington, D. C."